United States Patent [19]

Uchidoi et al.

[11] 3,907,414

[45] Sept. 23, 1975

[54] OPTICAL PROJECTOR CAPABLE OF RANDOM ACCESS AND REPEAT PROJECTIONS

[75] Inventors: Masanori Uchidoi, Kawasaki; Tateo Yamada, Tokyo, both of Japan

[73] Assignee: Canon Kabushiki Kaisha, Tokyo, Japan

[22] Filed: Nov. 6, 1973

[21] Appl. No.: 413,209

[30] Foreign Application Priority Data
Nov. 11, 1972  Japan............................ 47-113174

[52] U.S. Cl.................................... 353/25; 353/25
[51] Int. Cl.².......................................... G03B 23/02
[58] Field of Search............................. 353/25–27

[56] References Cited
UNITED STATES PATENTS

| | | | |
|---|---|---|---|
| 3,510,215 | 5/1970 | Bennett | 353/25 |
| 3,538,313 | 11/1970 | Thomas | 353/26 |
| 3,652,155 | 3/1972 | Scheibel | 353/25 |
| 3,733,122 | 5/1973 | Szymba | 353/25 |
| 3,757,091 | 9/1973 | Baker | 353/26 |

*Primary Examiner*—Richard E. Aegerter
*Assistant Examiner*—A. Jason Mirabito
*Attorney, Agent, or Firm*—Fitzpatrick, Cella, Harper & Scinto

[57] ABSTRACT

A slide film projector is disclosed which is selectively switched into the random access projection mode in which a desired slide film selected among a plurality of side films stored in a tray or the like may be projected, the repeat projection mode in which a desired number of preselected slide films may be sequentially and repeatedly projected or the normal projection mode in which a plurality of slide films may be automatically projected one by one in the predetermined order for a predetermined time interval. Various selection switches are provided on a keyboard to select one of said three projection modes and electronic control circuits to accomplish the selected projection mode are provided. Motors for transporting the slide film tray or the like and for placing a slide film into the projection position and returning the slide film from the projection position into the tray or the like after the projection are provided and controlled by the electronic control circuits.

10 Claims, 14 Drawing Figures

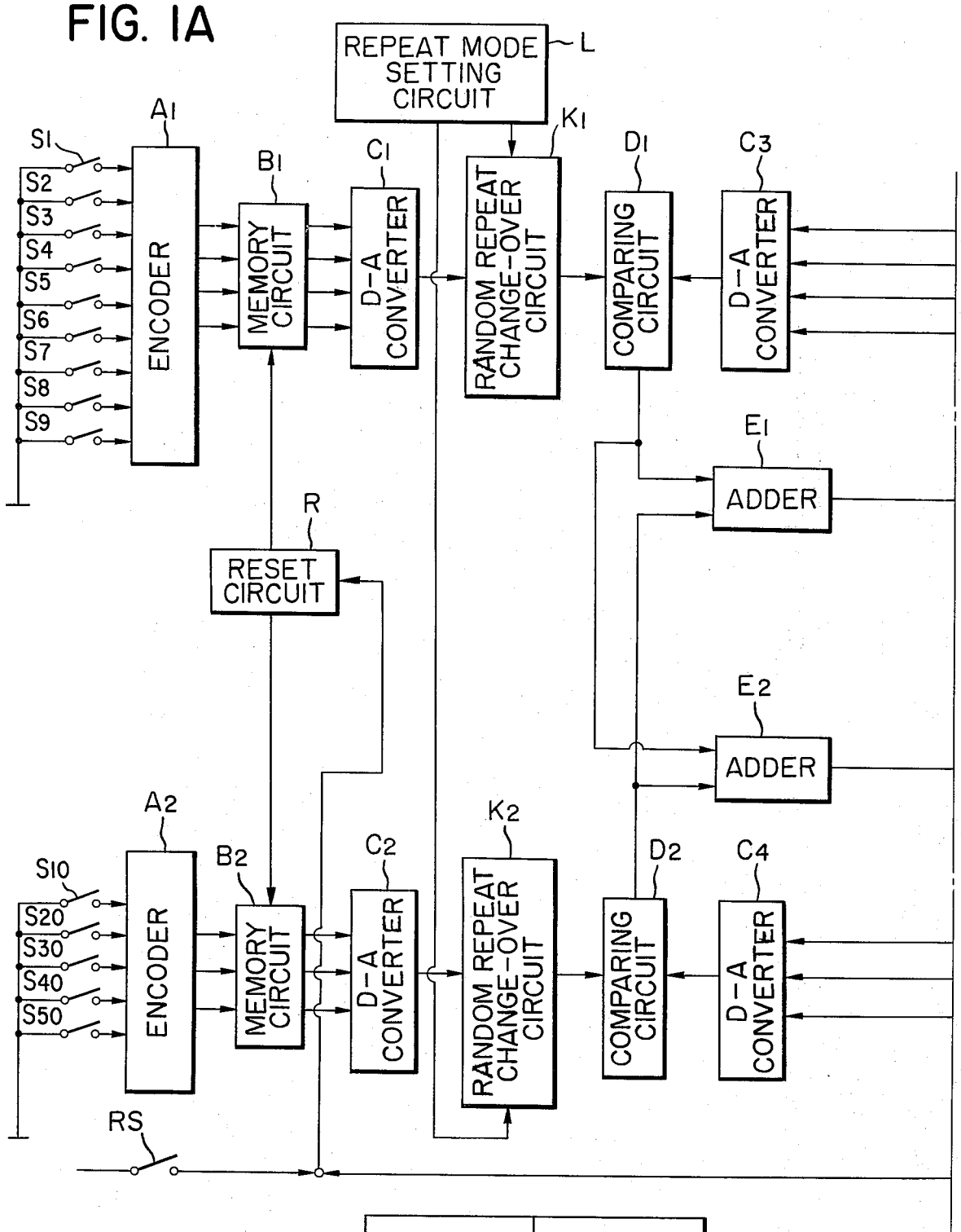
FIG. IA

OPTICAL PROJECTOR CAPABLE OF RANDOM ACCESS AND REPEAT PROJECTIONS

BACKGROUND OF THE INVENTION

1. Field of the Invention

The present invention relates to an optical projector not only capable of random access to a desired slide film for projection but also capable of projecting repeatedly a plurality of desired slide films.

2. Description of the Prior Art

It is generally preferable that a slide film projector may be switched selectively to the single projection mode in which a plurality of slide films stored or stacked in a tray may be projected sequentially in the order arranged, to the random access mode in which a desired slide film is automatically selected and projected, or to the automatic repeat projection mode in which a number of slide films are arbitrarily selected out of a plurality of slide films stored in a holder or tray and projected repeatedly.

A slide film projector provided with a random access mechanism disclosed for example in British Pat. No. 1,202,610 is provided with a rotatable slide tray and a control circuit with a manually operable selector means for random selection. Furthermore German Pat. No. 1,235,622 teaches means for use with a slide film projector for reading out the addresses attached to the slide films arrayed on a disk for random access.

However there has not yet devised and demonstrated a slide film projector which may be selectively switched from the random access mode to the automatic repeat projection mode in which a desired number of slide films may be automatically selected out of a plurality of slide films stored in a slide film tray, magazine or holder and projected sequentially and repeatedly.

SUMMARY OF THE INVENTION

One of the objects of the present invention is therefore to provide an optical projector provided with means for selectively switching the projector to the random access mode from the normal projection mode in which a plurality of slide films are projected one by one in response to the depression of a manual projection button.

Another object of the present invention is to provide an optical projector provided with means for selectively switching the projector to the automatic repeat projection mode from the random access projection mode and vice versa.

A further object of the present invention is to provide an optical projector comprising means for removably holding slide films, driving means operatively coupled to said slide film holding means so as to advance or reverse the same, means for operating said driving means, means for driving said operating means, means for switching the normal mode in which the slide films are advanced or reversed to the randon access mode, and means for interrupting the operative connection between said driving means and said slide film holding means, whereby either the normal projection mode or the random access projection mode may be selected.

The above and other objects, features and advantages of the present invention will become more apparent from the following description of one preferred embodiment thereof taken in conjunction with the accompanying drawing.

DESCRIPTION OF THE PREFERRED EMBODIMENT

Figure 1B:
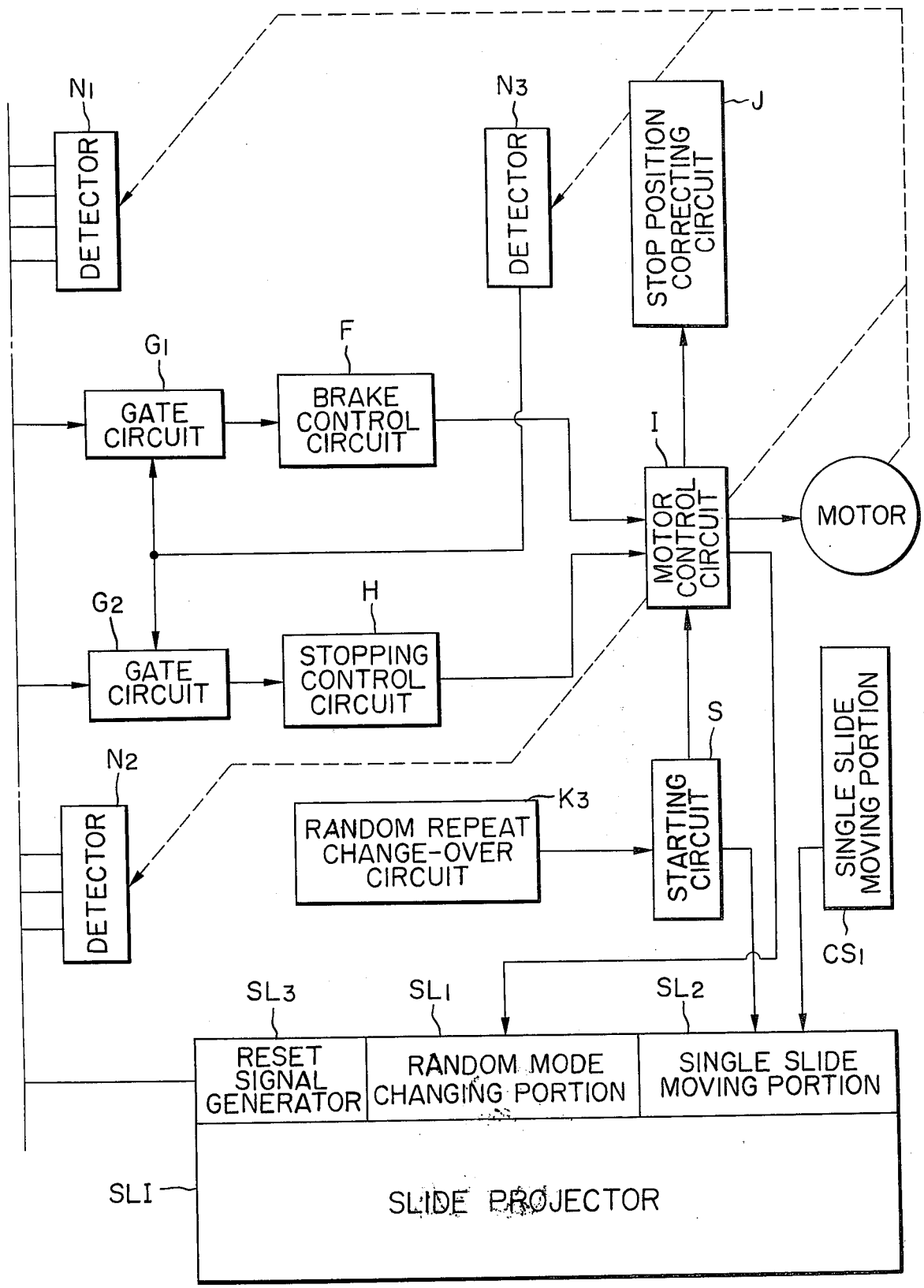
FIG. 1 is a block diagram of one preferred embodiment of a slide film projector in accordance with the present invention.

Referring to FIG. 1, in the random access mode the units digit of a desired slide film is selected by closing one of switches $S_1$-$S_9$ and the tens digit is selected by closing one of switches $S_{10}$-$S_{50}$. The selected units and tens digits are encoded by encoders $A_1$ and $A_2$ and stored in memories $B_1$ and $B_2$, respectively.

The digital signal stored in the memory $B_1$ which is converted into the analog signal by a digital-to-analog converter $C_1$ is applied to a random-repeat changeover or selection switch $K_1$. Since the projector is in the random access mode, the analog signal is transmitted through the selection circuit $K_1$ to a comparator $D_1$ to be compared with the analog signal from a digital-to-analog converter $C_3$ which converts into the analog signal the digital signal which represents the address of a slide film in the projection position and which is detected by a detector $N_1$.

Thus, $A_2$, $B_2$, $C_2$, $K_2$, $D_2$, $C_4$ and $N_2$ make up means for processing the signals from the switch group and the detector which represent the tens digits. In like manner, $A_1$, $B_1$, $C_1$, $K_1$, $D_1$, $C_3$ and $N_1$ make up means for processing the signals from the switch group and the detector which represent the units digits.

The output signals from the comparators $D_1$ and $D_2$ are applied to adders $E_1$ and $E_2$ of which the outputs are applied to a brake control circuit F or a stop control circuit H through gate circuits $G_1$ and $G_2$ which are opened only when a slide film is placed in the projection position, that is in the position at which a slide film is to be moved upwardly into the projection position.

The output signals of the brake and stop control circuits F and H are applied to a motor control circuit I. The brake control circuit F is provided in order to prevent the hunting phenomena caused when a slide film tray is advanced. The means $E_1$, $G_1$ and F may be eliminated if not necessary.

The output signal of a start circuit S is also applied to the motor control circuit I. The motor control circuit I functions in such a way that only when both the output signals from the start circuit S and the brake or stop control circuit F or H are simultaneously received, it causes a motor M to rotate in the forward or reverse direction. A third random-repeat selection circuit $K_3$ is adapted to give the output signal to the start circuit S only in case of the random access mode. As the motor M rotates, the slide film tray is advanced so that the output signals of the detectors $N_1$ and $N_2$ which detects the units and tens digits of the slide film in the projection position may vary. A stop position correcting circuit J is adapted to energize electromagnetic means such as a plunger to be described hereinafter in response to the signal from the motor control circuit I, thereby correcting the position at which is stopped the film tray. A detector $N_3$ detects the stop position control signal $24b$ (See FIG. 7) on a code disk 24 to be described hereinafter so as to energize electromagnetic means to stop the film tray at a predetermined position. That is, the detector $N_3$ detects the control signal $24b$ and transmits it to the gate circuits $G_1$ and $G_2$ to open them.

A repeat mode setting circuit L is adapted to switch the projector into the repeat mode in which a desired number of films are sequentially and repeatedly projected. The output signal of the repeat mode setting circuit L is applied to the random-repeat selection switches $K_1$ and $K_2$ so as to determine the number of slide films to be repeatedly projected.

The output signal of a reset circuit R is applied to the memories $B_1$ and $B_2$ to reset them. A slide projector $SL_1$ which is controlled by the means described hereinbefore incorporates a random access selection switch $SL_1$, a single projection mode switch $SL_2$, a reset signal generator $SL_3$ connected to the reset circuit R and a reset switch RS.

Figure 3:
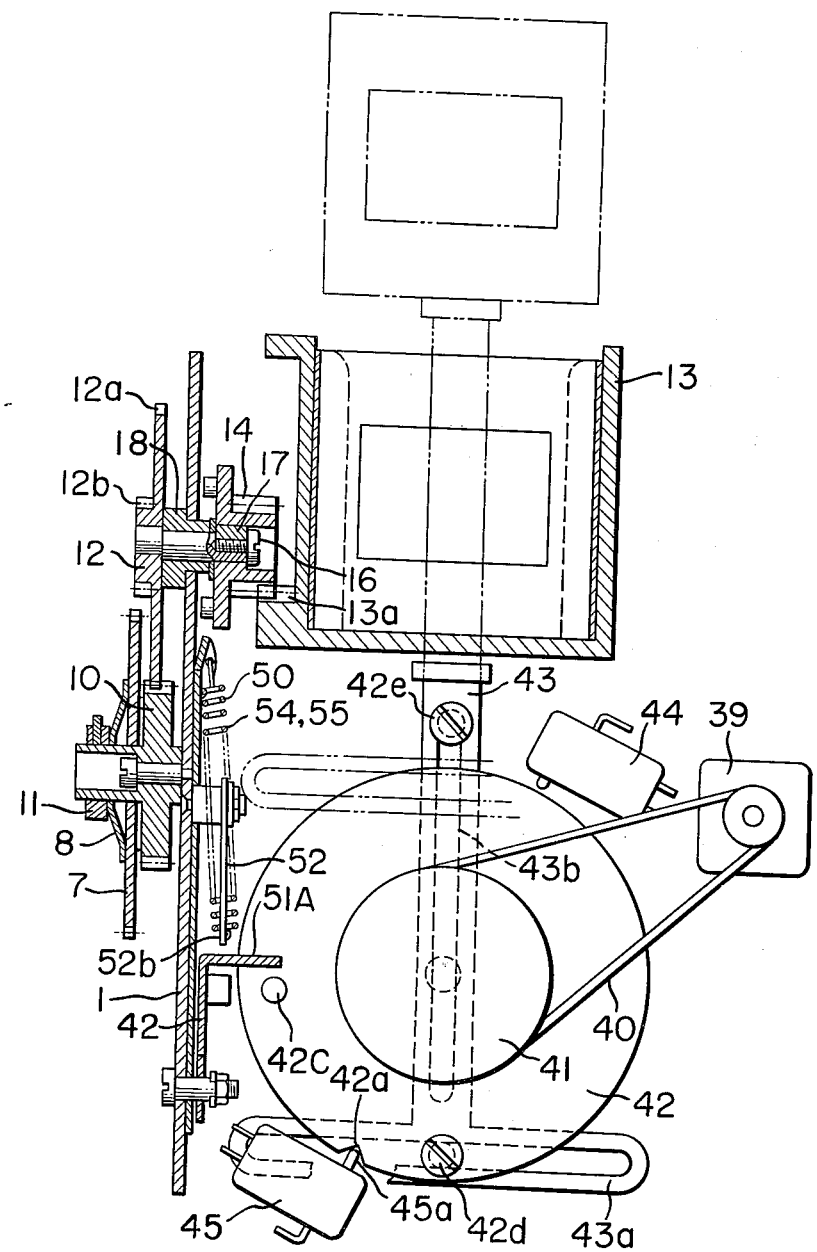
FIG. 3 is a cross sectional view taken along the line III—III of FIG. 2, illustrating the relation between the driving mechanism and a slide tray in which are stored a plurality of slide films.

Next the mode of operation will be described. When the start button in the start circuit S is depressed, the slide film in the projection position is returned into the slide tray if the slide film is in the projection position. The output of the start circuit S is applied to the motor control circuit I. The motor M is driven to transport the slide tray. As the tray is transported, the signal representing the position of the tray changes. When the signals representing the position of the tray coincide with those stored in the memories $B_1$ and $B_2$, the outputs of the comparators $D_1$ and $D_2$ become zero so that the motor M is stopped. In response to the signal representing the stop of the motor M, the stop position correcting circuit J and a circuit for pushing a slide film into the projection position which will be described hereinafter with reference to FIG. 3 are simultaneously energized. Furthermore in response to the output signal of the reset signal generator $SL_3$, the reset circuit R is energized to reset the memories. Thus the slide projector is returned to the initial position or state.

Next the single projection mode will be described. First the direction of the transport of the slide tray is selected, and then either of a single projection switch $CS_1$ in a control device or the single projection switch $SL_2$ in the slide projector SLI which is in parallel with the single projection switch $CS_1$ is closed so that the motor M is driven to transport or move the tray to bring the next slide film to the projection position. In response to the de-energization of the motor M, the slide film is pushed into the projection position.

Next the repeat projection mode will be described. First a number of slide films which are to be repeatedly projected is set by the repeat mode setting circuit L. Thereafter the tray is advanced to set the slide films one by one into the projection position. When the number of slide films set by the repeat mode setting circuit L coincides with the number of slide films projected, the tray is returned by a repeat mechanism to the initial position, that is the position at which the first slide film is to be placed into the projection position and the slide films are repeatedly and sequentially projected.

Figure 6:
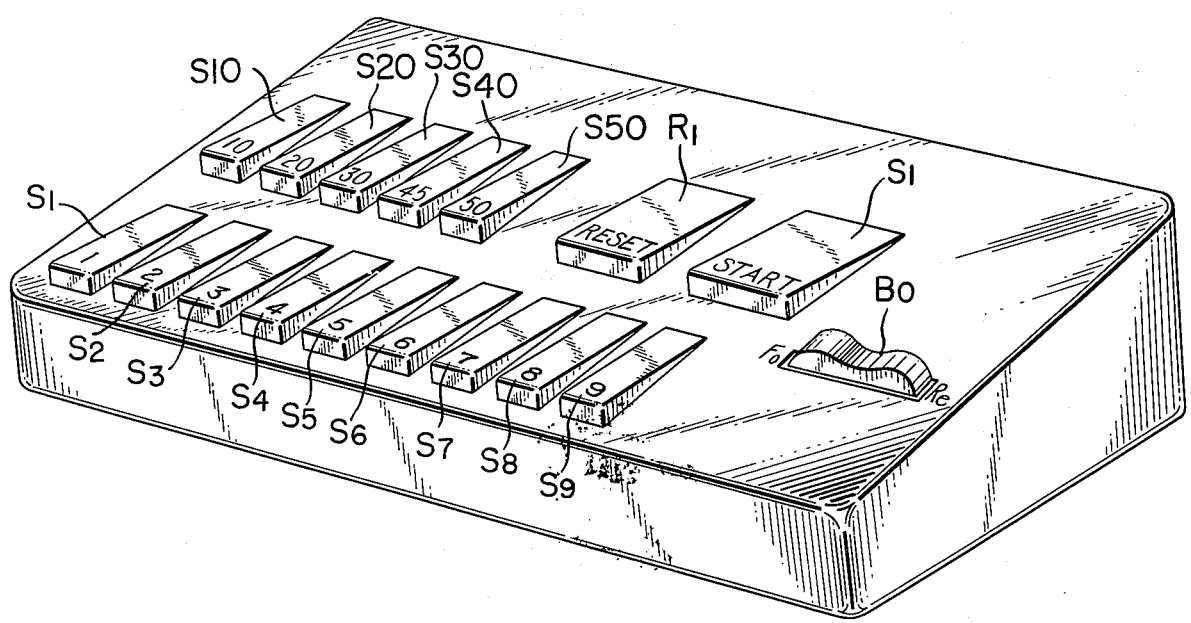
FIG. 6 is a perspective view of a control panel.

FIG. 6 shows the control panel or keyboard in which are incorporated the control means described above. In the instant embodiment, 50 slide films are stored in the slide tray, and their addresses are selected by the switches $S_1$-$S_9$, which select the units digits, and by the switches $S_{10}$-$S_{50}$, which select the tens digits, $R_1$ designates the reset switch of the reset circuit R in FIG. 1; $S_1$, a start switch in the start circuit S; and Bo, a switch for moving in the forward or reverse direction the slide tray one slide film by one slide film.

FIGS. 2, 3, 4 and 5 show the driving mechanism of the slide projector tray which is shown in block diagram in FIG. 1. The power of the driving motor 2 mounted on a mount 1 is transmitted through gears 3, 4, 5 and 6 to a gear 7 which is pressed against a gear 10 under the forces of springs 9 together with a pressure disk 8 so that the power is transmitted to the gear 10. The power transmitted to the gear 10 may be adjusted by changing the forces of the springs 9 by a member 11. A pinion 14 which is in mesh with a rack $13a$ formed along one side edge of the slide tray is fixed to a gear 12 by a screw 16 and a key 17. A bush 18 extends through the mount 1 so that the power is transmitted from the gear 12 to the pinion 14 and hence to the rack $13a$ so that the tray is moved. A large-diameter gear $12a$ receives the power from the gear 10 and the rotation of a smaller diameter gear $12b$ is transmitted through gears 19, 20 and 21 to a gear 22 upon which is force fitted over a transparent disk 23 upon which is fixed a coding disk 24 (See FIG. 7) used for detecting the positions of slide films in the tray.

Figure 7:
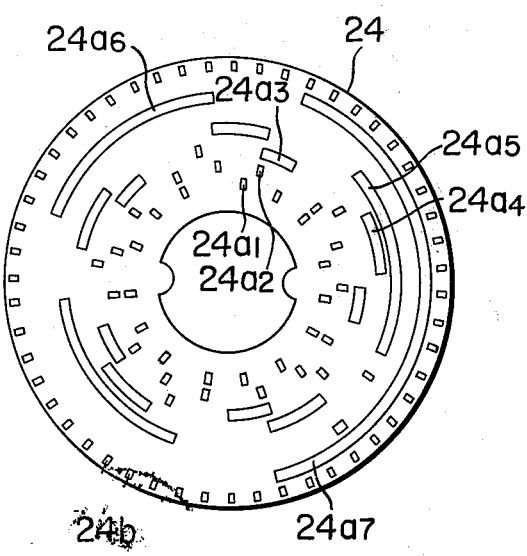
FIG. 7 is a top view of a code disk used for detecting the addresses of slide films in the tray.

Referring to FIG. 7, the coding disk 24 has transparent portions $24a1$-$24a7$ formed along concentric circles of different diameters and $24b$ formed along the periphery of the coding disk 24. The transparent portions $24a1$-$24a7$ are used in combination to represent the addresses of slide films in the tray as will be described in more detail hereinafter, and the transparent portions $24b$ are used to determine the positions at which the slide tray is stopped. More particularly the transparent portions $24b$ are provided so that one of the openings formed through the bottom of the tray exactly coincides with a member which is adapted to enter the opening to bring the slide film into the projection position. In response to the control signal provided by the transparent portions $24b$, the electromagnetic means to be described hereinafter is energized to stop the tray driving motor at a correct position. The address signal provided by the transparent portions $24a1$-

24a7 represents the address of a slide film which is to be placed into the projection position. When the desired slide film is brought to a position from which it is to be placed into the projection position, the slide tray is stopped, and the opening through the bottom of the tray for said desired slide film exactly coincides with the member which places the slide film into the projection position.

The number of each of the gears 14, 12b, 19, 20, 21 and 22 is so determined that there may be established one to one correspondence between the coding disk 24 and the number of the slides to be stored in the tray 13. Light emitted from light sources $27_1$-$27_n$ (where $n$ = integer) mounted upon an insulating plate 26 spaced apart by a predetermined distance by spacers 25 from the mount 1 is transmitted through the coding disk 24 and intercepted by photocells $103_1$-$103_n$. When the tray 13 is moved to a selected position, a plunger 30 is energized so that a roller 33 fixed to one end of a lever 32 coupled through a connecting link 31 to the plunger 30 may drop into a space between the adjacent pins 15 extended from the pinion 14 to stop the tray at a desired position. When the tray 13 is stopped, the plunger 30 is de-energized to prevent the overheating thereof.

Thereafter a push rod 43 is moved upwardly by a drive motor 39 whose rotation is transmitted to a rotary disk 42 through a belt and a pulley 41. When the push rod 43 is not pushing a slide film into the projection position, a contact 45a engages with a recess 42a formed in the periphery of the rotary disk 42 so that a switch 45 is opened. Therefore the tray 13 is advanced by the pinion 14. When the tray 13 is stopped at a desired position, the motor 39 is energized for a short time by an electric circuit to be described hereinafter so that the switch 45 is closed to keep the motor 39 energized. The motor 39 is kept energized until the recess 42a opens a switch 44 angularly spaced apart from the switch 45 by 180°.

Figure 5A:
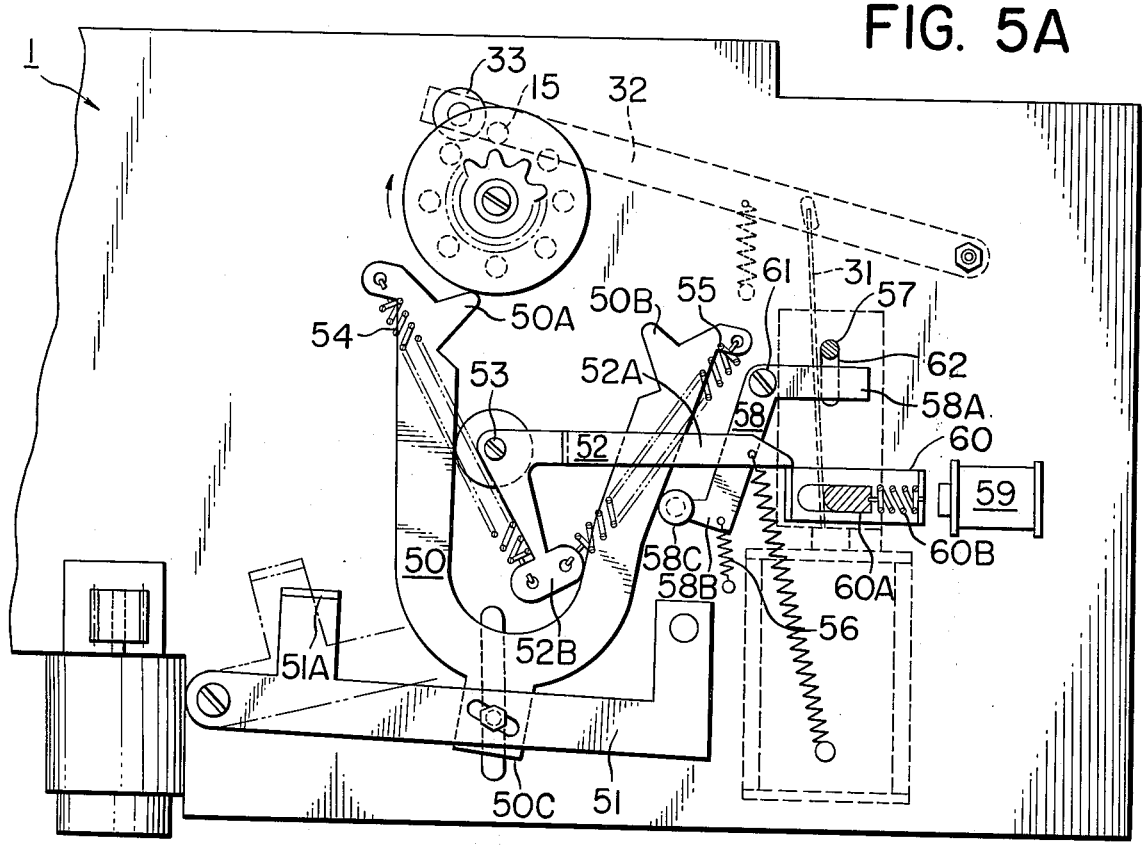
FIG. 5A is a front view of a slide film tray transport mechanism in the forward advance mode.

The mechanism for driving the pinion 14 so as to move the tray in the forward or reverse direction is shown in detail in FIGS. 5A, B and C. Reference numeral 51 denotes a lever whose one end is fixed to the mount 1 and which has a bent portion 51A; 50, a fork with a pair of pawls 50A and 50B; 52, a bell crank with arms 52A and 52B; 54 and 55, springs loaded between the pawls 50A and 50B of the fork 50 and the arm 52B of the bell crank 52, the spring 54 being stronger than the spring 55; 58, a rocker with arms 58A and 58B pivoted with a pivot pin 61, the arm 58B being provided with a roller 58C; 59, a magnet which is energized only for a predetermined time; and 60, a stopper which has a core 60A and a spring 60B disposed therein and which is actuated by the magnet 59. The stopper 60 normally releasably engages with the arm 52A of the bell crank 52.

Referring back to FIG. 3, a pin 42d extended from the rotary disk 42 is loosely fitted into an elongated slot 43a of the push rod 43, which pushes up a slide film into the projection position indicated by the two-dot chain lines. An elongated slot 43b is formed in the push rod 43 at a right angle to the elongated slot 43a and fitted over a pin 42e extended from the main body of the projector. Therefore the push rod 43 is guided by the pin 42e when it moves vertically. A pin 42c extended from the rotary disk 42 engages with the bent portion 51A of the lever 51.

FIG. 5A shows the state in which the slide tray 13 is advanced in the forward direction. The pawl 50A is to engage with the pin 15 extended from the pinion 14 as the fork 50 is swung by the springs 54 and 55 and the bell crank 52. When the tray 13 is stopped at a desired position, the rotation of the motor 39 is transmitted through the belt 40 and the pulley 41 to the rotary disk 42 which causes the push rod 43 to move upward thereby placing a slide film in the projection position. The switch 45 is opened when the push rod 43 is not pushing the slide into the projection position. The tray 13 is advanced as the pinion 14 rotates. When the tray 13 is stopped at a desired position by an electric circuit, the motor 39 is energized to rotate the rotary disk 42. The pin 42c of the rotary disk 42 engages with the bent portion 51A so that the lever 51 is pushed upward. The fork 50 is also moved upwardly so that its pawl 50A engages with the pin 15 to rotate the pinion 14. As a result the tray 13 is advanced to place the next slide into the projection position, and the bent portion or pawl 50A is relased from the pin 42C of the rotary disk 42 so that the fork 50 is returned to its initial position.

Figure 5B:
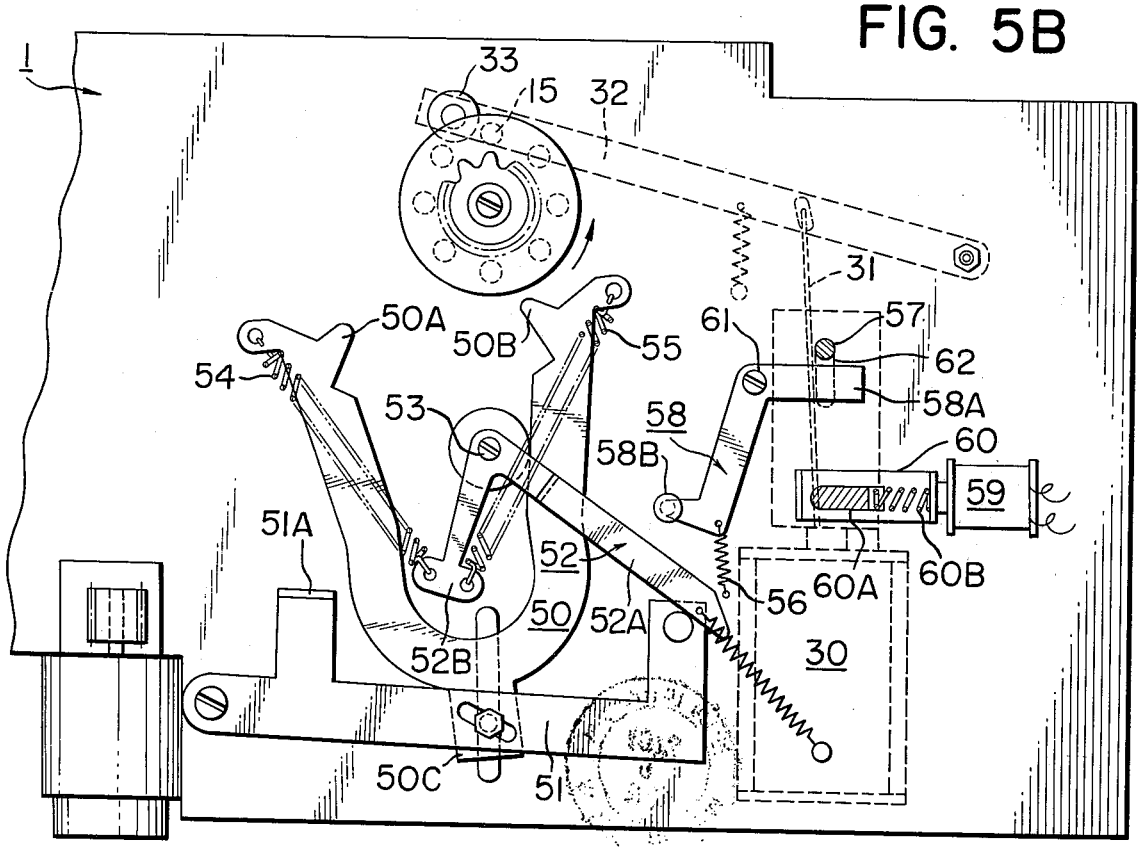
FIG. 5B is a view similar to FIG. 5A illustrating the slide tray transport mechanism in the reverse mode.

FIG. 5B shows the state in which the tray 13 is moved in the reverse direction. The magnet 59 is energized so that the stopper 60 is attracted. As a result the arm 52A of the bell crank 52 is released from the stopper 60, and the fork 50 is displaced so that the pawl 50B engages with the pin 15 of the pinion 14 to move the tray 13. As the rotary disk 42 rotates, its pin 42C engages with the bent portion 51A so that the lever 51 swings upwardly. Therefore the fork 50 is moved upwardly so that its pawl 50B engages with the pin 15 of the pinion 14 thereby rotating the pinion 14. Thus the tray 13 is moved in the reverse direction to place the next slide into the projection position. Thereafter the pin 42C of the rotary disk 42 is released from the pawl or bent portion 51A and the magnet 59 is energized only for a predetermined time so that the stopper is returned to its initial position before the fork 50 starts to return to its initial position. Therefore the arm 52A engages with the stopper 60 so that the tray transport mechanism is returned to the state to advance the tray in the forward direction.

Figure 5C:
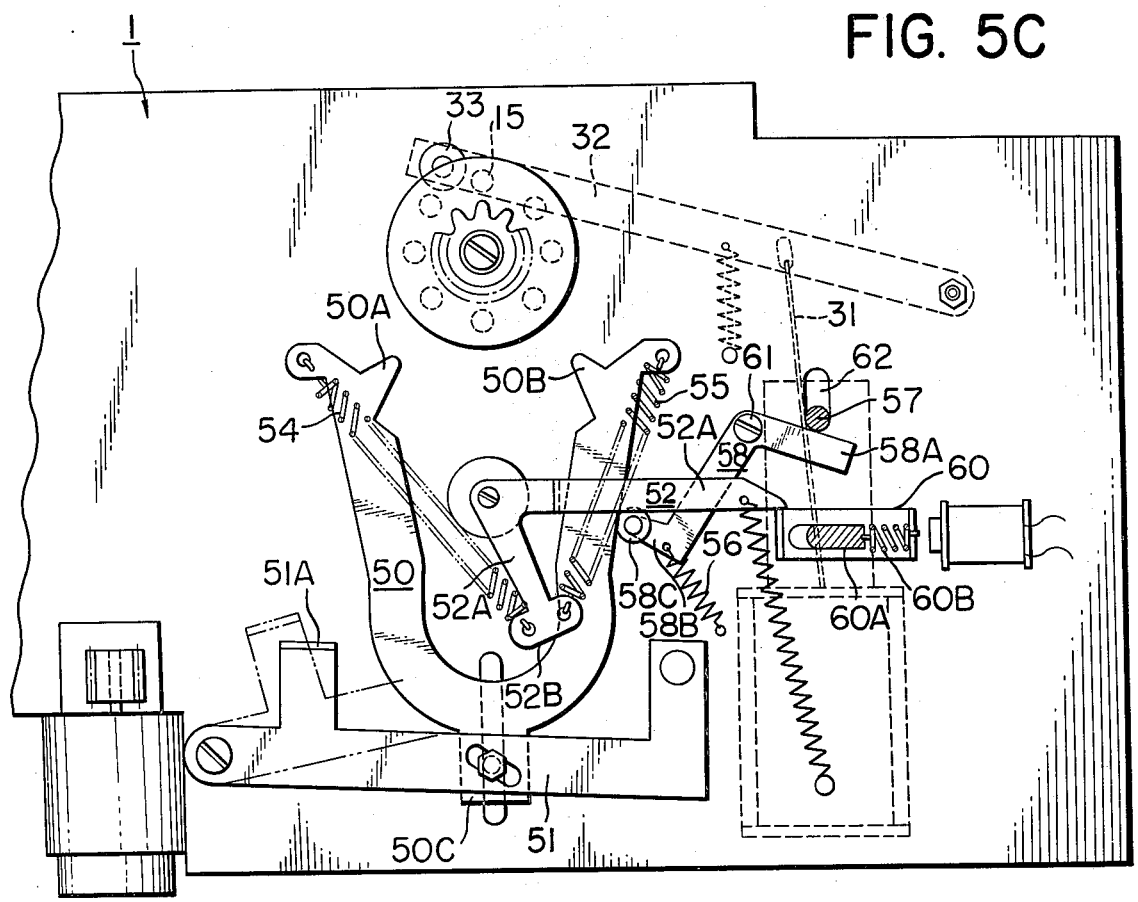
FIG. 5C is a view similar to FIG. 5A illustrating the transport mechanism in the random access mode.

FIG. 5C shows the state in which the fork 50 is moved upwardly only one time without rotating the pinion 14 in case of the random access mode.

In case of the random access mode when the number $n$-th slide film in the tray 13 is selected, the tray 13 is stopped to bring the $n$-th slide to a predetermined position. In order to place the $n$-th slide into the projection position, the push rod 43 is driven by the rotary disk 42. However when the rotary disk 42 is rotated, the pinion 14 is also rotated by the pawl of the fork 50 so that when the slide is placed into the projection position the tray 13 is simultaneously advanced. As a result the ($n$ + 1)-th slide is projected in practice. Therefore it is required to prevent the rotation of the pinion 14 when the slide is placed into the projection position. For this purpose, when the ($n$ - 1)-th slide is brought to a predetermined position, a pin 57 is caused to move downwardly the arm 58A of the rocker 58. Therefore the roller 58C on the other arm 58B of the rocker pushes the fork 50 into the neutral position. Therefore even when the fork 50 is moved upwardly, the pinion 14 is not rotated so that the desired $n$-th slide may be placed into the projection position.

Figure 8:
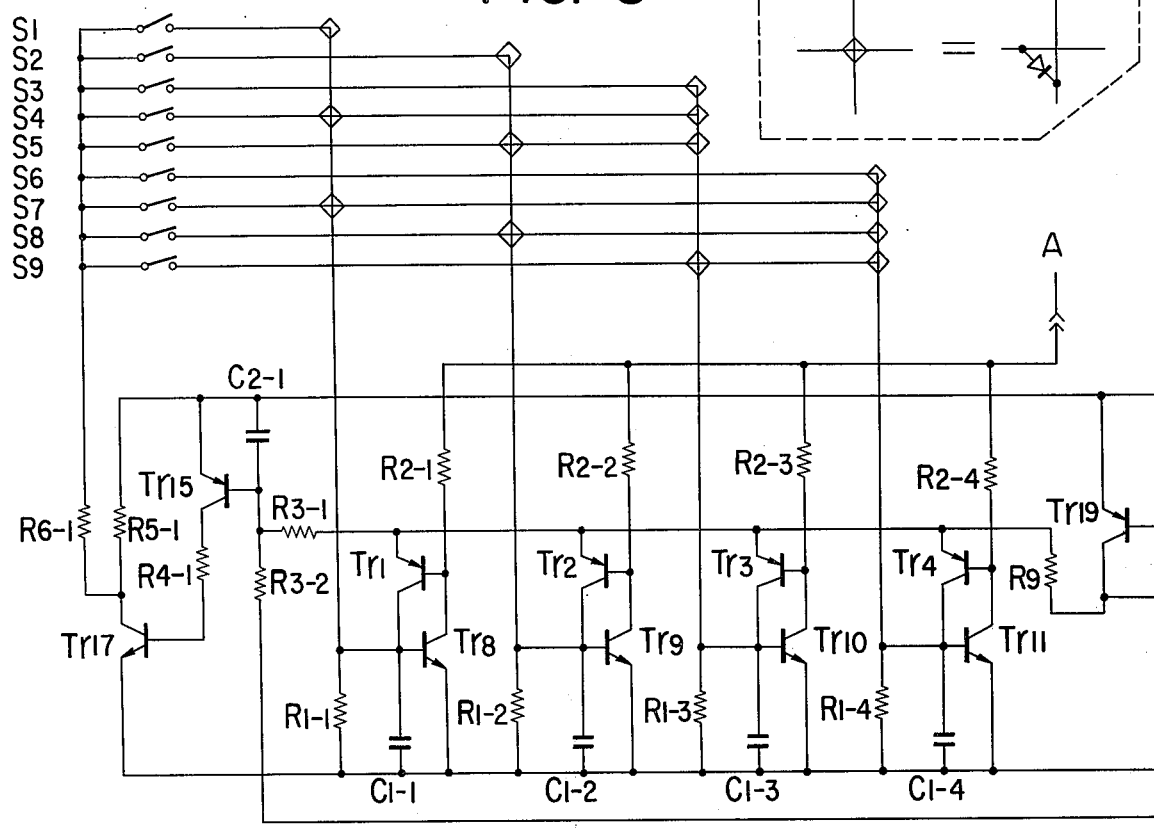
FIG. 8 is an electric circuit diagram of random access means.
Figure 8:
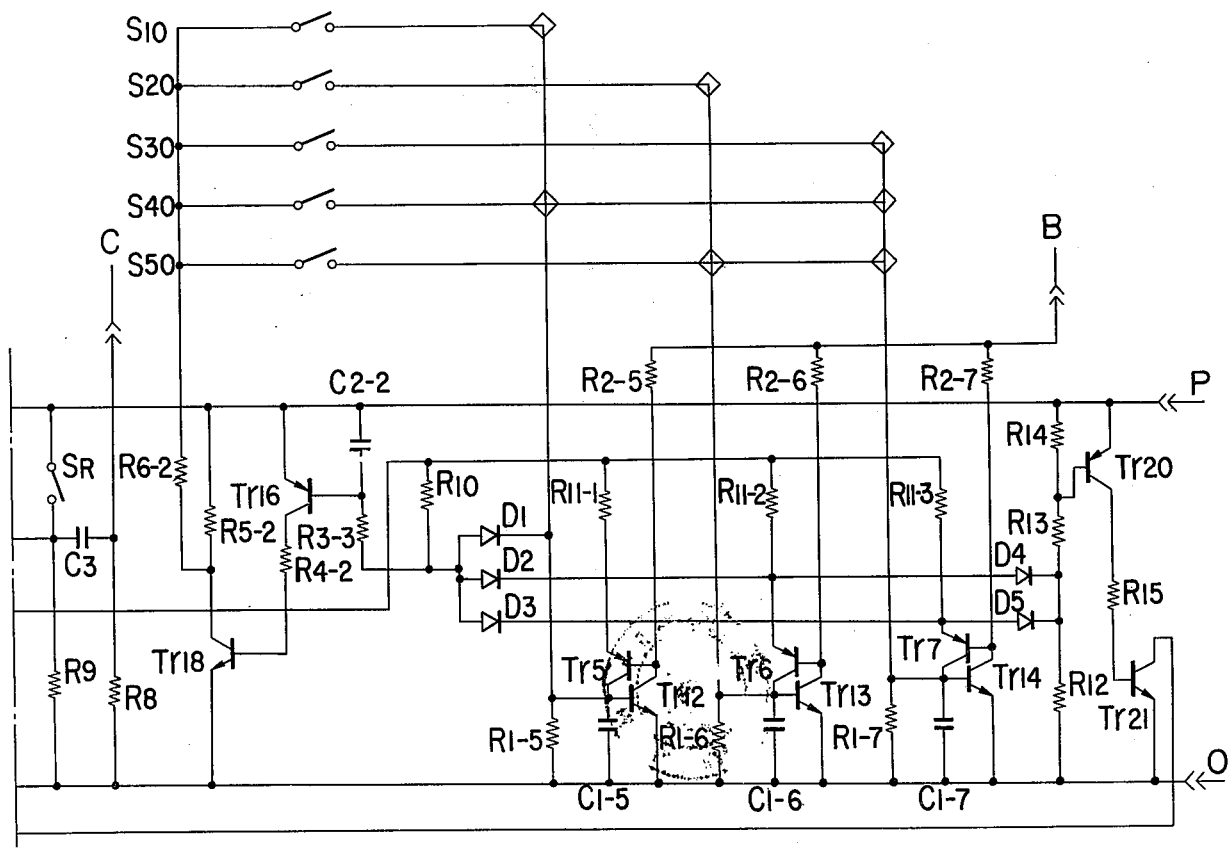

FIG. 8 is a diagram of an electric circuit for random access, and shows in detail the encoders $A_1$, and $A_2$, the memories $B_1$ and $B_2$, the D-A converters $C_1$ and $C_2$ and the reset circuit R.

The portion enclosed by a diamond is illustrated on enlarged scale in the portion enclosed by the broken lines. The portions enclosed by the diamonds make up diode matrixes which correspond to the encoders $A_1$ and $A_2$, respectively.

$S_1$-$S_9$ and $S_{10}$-$S_{50}$ are switches shown in FIG. 6, and the switches $S_1$-$S_9$ are used to select the units digits whereas the switches $S_{10}$-$S_{50}$, to select the tens digits. The reset circuit R for resetting the memories $B_1$ and $B_2$ has a reset switch SR. A, B, C, P and O denote terminals for connection with the main body of the projector. The output terminal A provides the signal representing the units digit whereas the output terminal B, the signal representing the tens digit. The output terminal C transmits the reset signal in the direction indicated by the arrow. The terminals P and O are for connection with a power source (not shown). For example the potential at the terminal P is O volt whereas the potential at the terminal 0 is $-6$ volts.

PNP transistors $Tr_1$-$Tr_7$, NPN transistors $Tr_8$-$Tr_{14}$ and resistors $R_{11}$-$R_{17}$, $R_9$ and $R_{11-1}$-$R_{11-3}$ make up a self-holding circuit. Capacitors $C_{1-1}$ which are interconnected between the junctions between the collectors of the transistors $Tr_1$-$Tr_7$ and the bases of the transistors $Tr_8$-$Tr_{11}$ and the terminal O make up memories $B_1$ and $B_2$.

Resistors $R_{2-1}$-$R_{2-7}$ are those used to weight the outputs of the D-A converters $C_1$ and $C_2$. Transistors $Tr_{15}$-$Tr_{18}$, $Tr_{20}$ and $Tr_{21}$ and resistors $R_{3-2}$, $R_{3-3}$, $R_{4-1}$, $R_{5-1}$, $R_{5-2}$, $R_{6-1}$, $R_{6-2}$, $R_{10}$, $R_{12}$, $R_{13}$, $R_{14}$ and $R_{15}$ make up means for only transmitting the first signals entered by the keyboard shown in FIG. 6 to a processing circuit.

Next the mode of operation will be described. FIG. 6 shows the keyboard by which any of fifty slide films in the tray may be selected at random. The mode of operation for detecting the slide film which is selected by the key-in on the keyboard.

For example it is assumed that the sixth slide film in the tray be selected. First the switch $S_6$ is depressed to close it. The current flowing from the terminal P flows into the base of the transistor $Tr_{11}$ through the resistors $R_{5-1}$ and $R_{6-1}$, the switch $S_6$ and the diode matrix. Therefore, the transistor $Tr_{11}$ is conducted so that the current flows into the base of the transistor $Tr_4$ and between the collector and emitter of the transistor $Tr_{11}$. Therefore the transistor $Tr_4$ is turned on. Thus the current flows into the base of the transistor $Tr_{11}$ through the channel between the emitter and collector of the transistor $Tr_{19}$, the resistor $R_9$ and the channel between the collector and emitter of the transistor $Tr_4$ so that the transistors $Tr_4$ and $Tr_{11}$ remains turned on even when the switch $S_6$ is released or opened.

The output terminal A which provides the signal representing the units digit is connected to the terminal O, which is maintained at a negative voltage, through the resistor $R_{2-4}$ and the transistor $Tr_{11}$. Therefore the current whose magnitude is dependent upon the value of the resistor $R_{2-4}$ flows as the signal.

Since the transistors $Tr_4$ and $Tr_{11}$ are turned on, the base current of the transistor $Tr_{15}$ flows from the collector to emitter of the transistor $Tr_{11}$ through the resistor $R_{3-1}$ so that the transistor $Tr_{15}$ is turned on. As a result the base current from the transistor $Tr_{17}$ flows from the collector to emitter of the transistor $Tr_{15}$ and through the resistor $R_{4-1}$ so that the transistor $Tr_{17}$ is turned on. The common terminal of the switches $S_1$-$S_9$ is connected to the terminal O through the resistor $R_{6-1}$, and the transistor $Tr_{17}$ (from collector to emitter) so that even when any of the switches $S_1$-$S_9$ is closed, no signal is transmitted to the memory $B_1$ for the units digit.

So far the switches $S_{10}$-$S_{50}$ for selecting the tens digits have not been depressed, no output appears at the output terminal B. If any of the switches $S_{10}$-$S_{50}$ is depressed, a pair of transistors are turned on so that the output current flows to the terminal B through either of the resistor $R_{2-5}$ or $R_{2-7}$. Once the signal representing the tens digit is entered, the transistors $Tr_{16}$ and $Tr_{18}$ are turned on so that even when any of the switches $S_{10}$-$S_{50}$ is depressed erroneously, the content in the memory $B_2$ for the tens digit will not change.

When any of the switches $S_{10}$-$S_{40}$ except $S_{50}$ is depressed, the current flows through at least one of diodes $D_1$-$D_3$. When the switch $S_{50}$ is depressed, diodes $D_4$ and $D_5$ are cut off so that the base current of the transistor $Tr_{20}$ flows through the resistors $R_{13}$ and $R_{12}$. Therefore the transistor $Tr_{20}$ is turned on so that the transistor $Tr_{21}$ is also turned on. The base current of the transistor $Tr_{15}$ flows through the resistor $R_{3-2}$ and the transistor $Tr_{21}$ so that the transistor $Tr_{15}$ is turned on. Therefore the transistor $Tr_{17}$ is also turned on. Thus even when any of the switches $S_1$-$S_9$ is depressed after the switch $S_{50}$ has been depressed, the signal representing a units digit will not be transmitted to the circuit described above. The circuit described so far is an example of protective means which prevents the erratic operation when an address higher than 50 is entered when the tray contains only 50 slides.

Next the mode of releasing the random access projection by erasing the signals stored in the manner described hereinbefore will be explained. There are two methods to release the random access projection mode. One is to apply the reset signal to the terminal C in FIG. 8, and the other is to depress the reset switch SR.

i. Application of Reset Signal to Terminal C

Figure 11:
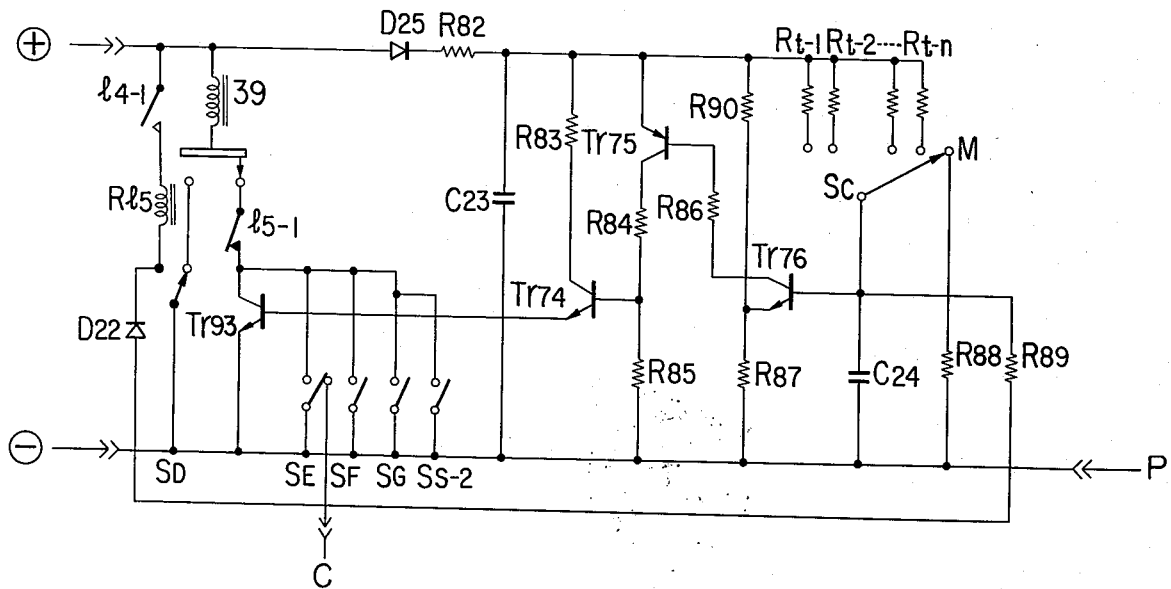
FIG. 11 is a diagram of an electric circuit incorporated in the main body of the slide projector shown in FIG. 1.

When the desired slide film has been placed in the projection position, the terminal C is connected to the terminal P through a switch SE on the side of the projector (See FIG. 11). When the reset signal arrives at the terminal C, the differentiating circuit comprising a capacitor $C_3$ and the resistors $R_8$ and $R_9$ generates a pulse signal which is applied to the base of the transistor $Tr_{19}$. Therefore the transistor $Tr_{19}$ is cut off for a predetermined time so that the transistors $Tr_4$ and $Tr_{19}$ are cut off.

ii. Depression of Reset Switch SR

When a wrong address is entered or when it is desired another slide film after the address of one slide has been already entered, the reset switch SR is depressed so that the base and the emitter of the transistor $Tr_{19}$ are short-circuited. Therefore the transistor $Tr_{19}$ is cut off so that the transistors $Tr_4$ and $Tr_{11}$ are cut off.

Figure 9A:
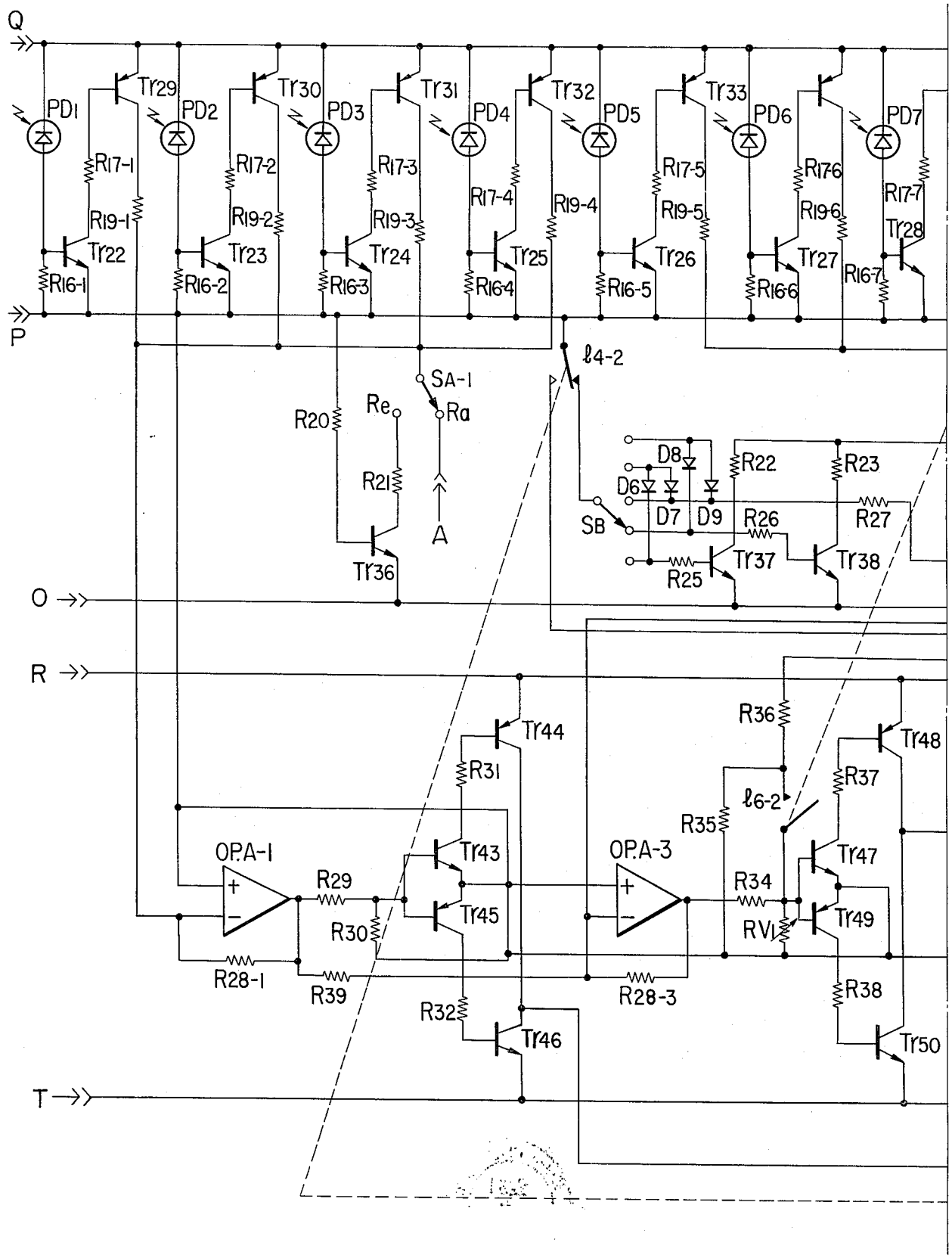
FIG. 9 is an electric circuit diagram of means for detecting whether the slide film in the projection position has a desired slide film address or not.
Figure 9B:
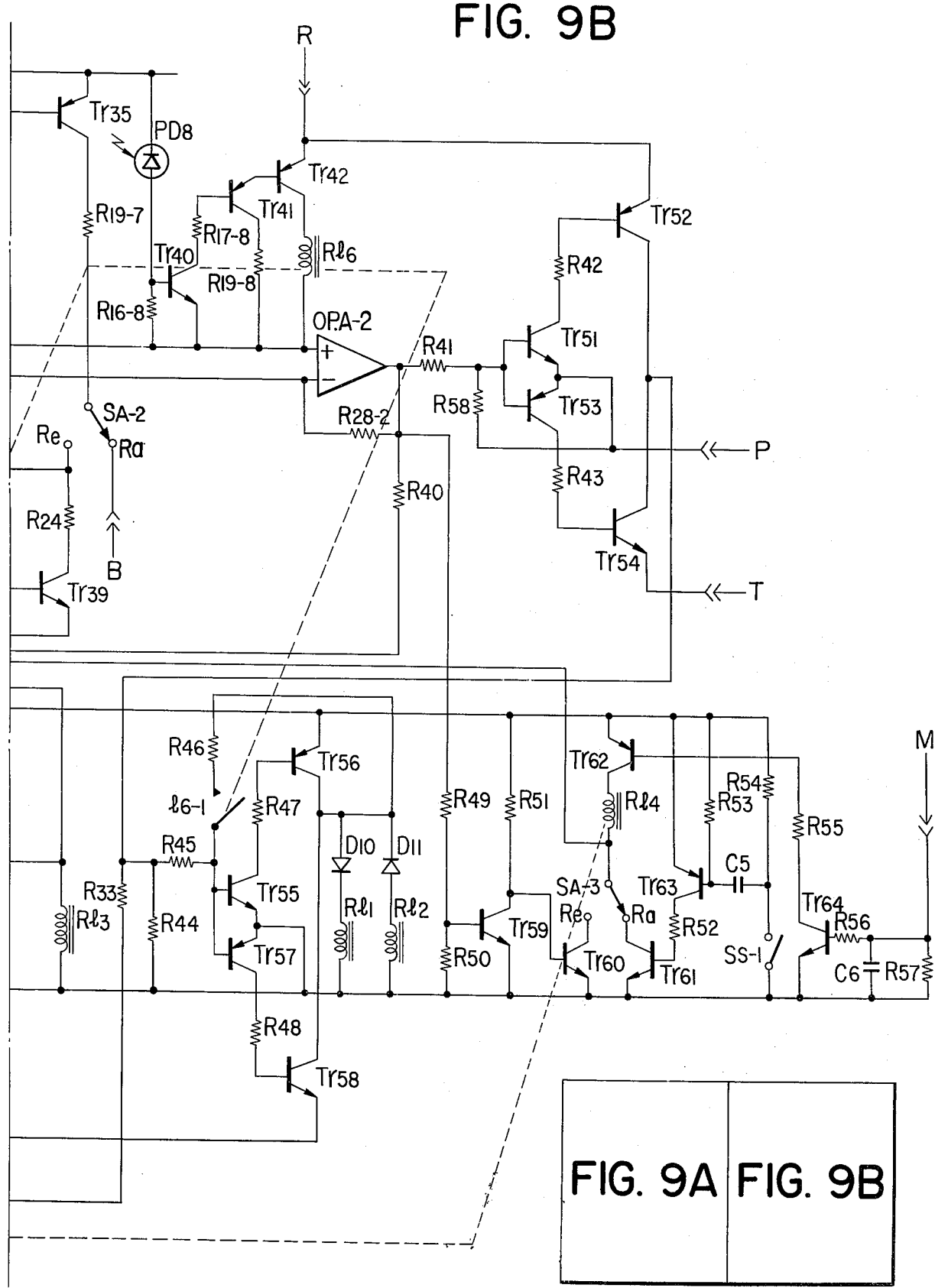

FIG. 9 shows a diagram of a circuit for detecting address of the slide film in the projection position to compare with the signals from the circuit shown in FIG. 8. The circuit shown in FIG. 9 includes the random-repeat selection circuits $K_1$, $K_2$ and $K_3$, the comparators $D_1$ and $D_2$, the D-A converters $C_3$ and $C_4$, the slide film address detectors $N_1$ and $N_2$, the adders $E_1$ and $E_2$, the gate circuits $G_1$ and $G_2$, the motor brake control circuit F, the motor stop control circuit H and the motor start circuit S shown in block diagram in FIG. 1.

A positive voltage for example +6 volts is applied to an input terminal Q whereas a negative voltage of for example −6 volts is applied to a terminal O. A negative voltage of −12 volts is applied to an input terminal T whereas a positive voltage of for about +12 volts is applied to an input terminal R. A terminal M is connected to the terminal R when either of a relay $RL_1$ or $RL_2$ is energized.

$PD_1$-$PD_8$ are photodiodes which correspond to the photocells $101_1$-$103_n$ shown in FIG. 1. Amplifier-switching circuit comprises transistors $Tr_{22}$-$Tr_{35}$ and $Tr_{40}$-$Tr_{42}$, and resistors $R_{16-1}$-$R_{16-8}$, $R_{17-1}$-$R_{17-8}$ and $R_{19-1}$-$R_{19-8}$ and amplifies the outputs of the photodiodes $PD_1$-$PD_8$. The amplifier-switching circuit corresponds to the detectors $N_1$ and $N_2$ shown in FIG. 1. The photodiode $PD_8$ is used to receive the light transmitted through the transparent portions $24b$ of the coding disk shown in FIG. 7 in order to stop the tray in a correct position.

Random-repeat selection switches SA-1 and SA-2 have contacts Ra for random access mode and contacts Re for repeat mode. SB is a repeat mode setting switch, and SS-1 is a random access projection start switch.

The relays $Rl_1$ for controlling the movement of the tray in the forward direction, the relay $Rl_2$ for controlling the movement of the tray in the reverse direction, a relay $Rl_3$ for controlling the brake of the motor, a relay $Rl_4$ for holding relays in case of the random access projection and repeat projection modes, a relay $Rl_5$ for controlling the start of the motor 2, a relay $Rl_6$ for controlling the gate circuits, and relay contacts $l_{1-t}$, $l_{2-t}$, $l_{3-t}$, $l_{4-t}$, $l_{5-t}$ and $l_{6-t}$ whose on-off operations are controlled by the relays are inserted into the circuits shown in FIGS. 9–11.

The input and output terminals of operational amplifiers OPA-1, OPA-2 and OPA-3 are interconnected by feedback resistors $R_{28-1}$, $R_{28-2}$ and $R_{28-3}$, respectively. They correspond to the comparators $D_1$ and $D_2$ shown in FIG. 1.

Resistors $R_{17-1}$-$R_{17-4}$ and resistors $R_{14-5}$-$R_{19-7}$ are inserted to flow the currents whose magnitudes are dependent upon the signals representing the units and tens digits into the operational amplifiers OPA-1, OPA-2 and OPA-3. They correspond to the D-A converters $C_3$ and $C_4$ shown in FIG. 1.

Transistors $TR_{43}$-$Tr_{46}$, resistors $R_{30}$-$R_{32}$, transistors $Tr_{51}$-$Tr_{54}$, resistors $R_{58}$, $R_{42}$ and $R_{43}$, transistors $Tr_{47}$-$Tr_{50}$, a variable resistor $RV_1$, resistors $R_{37}$ and $R_{38}$, transistors $Tr_{55}$-$Tr_{58}$ and the resistors $R_{47}$ and $R_{48}$ make up a circuit for amplifying the input to turn on or off a switching transistor.

The relay contact $l_{6-2}$, resistors $R_{35}$ and $R_{36}$, the relay contact $l_{6-1}$ and a resistor $R_{46}$ make up gate circuits $G_1$ and $G_2$ shown in FIG. 1.

Resistors $R_{39}$ and $R_{40}$, the operational amplifier OPA-3 with the resistor $R_{28-3}$ make up the adder circuit $E_1$. The transistors $Tr_{55}$-$Tr_{58}$ and the resistors $R_{33}$, $R_{44}$, $R_{45}$, $R_{47}$ and $R_{48}$ make up the adder $E_2$ shown in FIG. 1. Transistors $Tr_{47}$-$Tr_{50}$, resistors $R_{37}$, $R_{37}$, $R_{38}$, the variable resistor $RV_1$ and the relay $Rl_3$ make up the brake control circuit shown in FIG. 1.

The circuit shown in FIG. 9 further comprises resistors $R_{20}$-$R_{27}$, $R_{29}$, $R_{33}$, $R_{34}$ and $R_{50}$-$R_{57}$ capacitors $C_5$ and $C_6$, diodes $D_6$-$D_{11}$, and transistors $Tr_{37}$-$Tr_{39}$ and $Tr_{59}$-$Tr_{64}$.

The signal A (negative current) shown in FIG. 8 is applied to the operational amplifier OPA-1, and the signals in the form of current from the photodiodes are applied to the reverse input. Therefore the operational amplifier OPA-1 compare these currents, and amplifies the difference therebetween as an output. In like manner the operational amplifier OPA-2 compares the current signal B for keyboard shown in FIG. 8 with the signal representing the tens digit of the address of the slide film in the projection position and amplifies the difference therebetween as an output signal. The resistors are so selected that the output of a units digit for each slide may be $|1|$ volt (where $|\ |$ = absolute value) and the output for a tens digit for every 10 slides may become about $|1|$ volt. It is of course possible to select the output voltages other than unity.

The switches SA-1, SA-2 and SA-3 correspond to the random-repeat selection circuits $K_1$, $K_2$ and $K_3$ shown in FIG. 1, respectively.

The functions of the transistors $Tr_{43}$-$Tr_{46}$ and the resistors $R_{30}$-$R_{32}$ are to amplify the input applied to the common base of the transistor $Tr_{43}$ and $Tr_{45}$ for switching. If the input is positive, the transistors $Tr_{43}$ and $Tr_{44}$ are turned on, and the output derived from the common collector of the transistors $Tr_{44}$ and $Tr_{46}$ is transmitted to the positive terminal R of the power source. When the input is negative, the transistors $Tr_{45}$ and $Tr_{46}$ are turned on and the output derived from the common collector of the transistors $Tr_{44}$ and $Tr_{46}$ is applied to the negative terminal T of the power source.

The output of the operational amplifier OPA-1 is applied through the resistor $R_{29}$ to the common base of the transistors $Tr_{43}$ and $Tr_{45}$ whereas the output of the operational amplifier OPA-2 is applied through the resistor $R_{41}$ to the common base of the transistors $Tr_{51}$ and $Tr_{53}$.

Next the mode of selecting a desired slide film will be described. When the slide film with the address 6 is moved into the projection position, light is intercepted by the photodiodes $PD_4$ and $PD_8$ through the coding disk shown in FIG. 7. As a result the base current flows into the transistors $Tr_{25}$ and $Tr_{40}$ so that they are turned on. Then the transistors $Tr_{32}$, $Tr_{41}$ and $Tr_{42}$ are turned on so that the current flows through the resistor $R_{19-4}$ and the relay $Rl_6$ is energized. The relay contacts $l_{6-1}$ and $l_{6-2}$ are switched to the normally open side so that the gate circuits $G_1$ and $G_2$ are opened. Therefore the current flows from the power source into the resistor $R_{19-4}$ through the transistor $Tr_{32}$.

When the slide film with the address 6 moves past the projection position, no light is intercepted by the photodiode $PD_8$ so that the transistor $Tr_{40}$ is cut off. Therefore the transistors $Tr_{41}$ and $Tr_{42}$ are also cut off and the relay $Rl_6$ is de-energized. Thereafter light beam to the photodiode $PD_4$ is cut off so that the transistors $Tr_{25}$ and $Tr_{32}$ are cut off and no current flows through the resistor $R_{19-4}$. When the tray is further advanced so that the 7th slide approaches the projection position, light is intercepted by the photodiodes $PD_1$ and $PD_4$ so that the transistors $Tr_{22}$ and $Tr_{25}$ are turned on. The transistors $Tr_{29}$ and $Tr_{32}$ are also turned on to flow the current through the resistors $R_{19-1}$ and $R_{19-4}$. When the tray reaches the position at which No. 7 slide is to be replaced into the projection position, light is intercepted by the photodiode $PD_8$ so that the relay $Rl_6$ is energized to open the contacts $l_{6-1}$ and $l_{6-2}$ of the gate circuits $G_1$ and $G_2$.

When the contacts Ra of the switch SA-1, SA-2 and SA-3 are closed when the start switch SS-1 is depressed for random access projection, the base current flows into the transistor $Tr_{63}$ through the capacitor $C_5$ so that the transistor $Tr_{63}$ is turned on to flow the current through the resistor $R_{52}$. Therefore the transistor $Tr_{61}$ is turned on.

When the address of a slide selected at random is different from that of a slide in the projection position, the transistor $Tr_{62}$ is turned on so that the relay $Rl_4$ is energized. Therefore the relay contact $l_{4-2}$ is switched to the normally open side ($\Delta$ side in FIG. 9) so that the relay $Rl_4$ is self-held. The current flows into the operational amplifier OPA-1 or OPA-2 through the resistors $R_{2-i}$ and $R_{10-i}$ ($i = 1-8$). The output current of the operational amplifier OPA-1 is given by $$V_1 = \frac{R_{2K-1}}{R_{2-i}} \times \text{potential at } O \, (-6 \text{ volts}) + \frac{R_{2K-1}}{R_{19-i}} \times \text{potential at } Q \, (+6 \text{ volts})$$

and the output current of the operational amplifier OPA-2 is given by $$V_2 = \frac{R_{2K-2}}{R_{2-i}} \times \text{potential at } O \, (-6 \text{ volts}) + \frac{R_{2K-2}}{R_{19-i}} \times \text{potential at } Q \, (+6 \text{ volts})$$

The voltages depending upon the resistances of the resistors $R_{2-i}$ and $R_{19-i}$ may be derived. These voltages represent the address of the slide film.

The output current flows through the resistors $R_{39}$ and $R_{40}$ into the operational amplifier OPA-3, the output of which is given by $$\frac{R_{2K-3}}{R_{39}} \times V_1 + \frac{R_{2K-3}}{R_{40}} \times V_2 = V_3$$

The ratio between the resistances of the resistors $R_{39}$ and $R_{40}$ is selected 10 : 1 so that the output voltage $V_3$ is in proportion to the number of slides passed. That is, the output voltage $V_3$ represents the difference between the address entered by the keyboard and the address of the slide in the projection position.

The output voltage $V_3$ is divided by the resistor $R_{34}$ and the variable resistor $RV_1$ and applied to the common base of the transistors $Tr_{47}$ and $Tr_{49}$. The resistances of the resistor $R_{34}$ and the variable resistor $RV_1$ are so selected that when the output voltage $V_3$ is increased to a level corresponding to for example four slide films either of the transistor $Tr_{47}$ or $Tr_{49}$ is turned on. Therefore the relay $Rl_3$ is de-energized when the selected slide is spaced apart from the projection position by three slides, and the normally closed contact ($\blacktriangle$ side in FIG. 10) of the relay contact $l_3$ is closed so that brake is applied to the motor as will be described in more detail hereinafter. The point at which brake is applied may be arbitrarily selected by the variable resistor $VR_1$.

The output voltage $V_1$ of the operational amplifier OPA-1 is divided by the resistors $R_{29}$ and $R_{30}$ and applied to the common base of the transistors $Tr_{43}$ and $Tr_{45}$. The resistances of the resistors $R_{29}$ and $R_{30}$ are so selected that either of the transistor $Tr_{43}$ or $Tr_{45}$ is turned on unless the output voltage $V_1$ is zero.

In like manner the output voltage $V_2$ turns on the transistors $Tr_{51}$ and $Tr_{53}$.

When these transistors are turned on the transistors $Tr_{44}$ and $Tr_{52}$ or $Tr_{46}$ and $Tr_{54}$ are turned on. When the output voltage $V_1$ representing the units digit is positive the transistors $Tr_{43}$ and $Tr_{44}$ are turned on so that the current flows into the common base of the transistors $Tr_{55}$ and $Tr_{57}$ through the resistors $R_{33}$ and $R_{45}$. When the voltage $V_2$ representing the tens digit is negative, the transistors $Tr_{53}$ and $Tr_{54}$ are turned on, so that the current flows through the resistor $R_{45}$ into the common base of the transistors $Tr_{55}$ and $Tr_{57}$. As described above, when the voltages $V_1$ and $V_2$ have different polarities, the priority is given to the voltage $V_2$ representing the tens digit because this voltage must be applied through the resistor $R_{33}$. But when they have the same polarity they have the same priority.

Therefore when the next slide film is selected after the completion of the projection of the first slide film, the tray is moved in the reverse direction when the address of the second slide film is smaller than that of the first slide film but the tray is moved in the forward direction when the address of the second film is higher than that of the first film.

When the transistors $Tr_{57}$ and $Tr_{58}$ are turned on, the potential at the common collector of the transistors $Tr_{56}$ and $Tr_{58}$ is negative so that the diode $D_{11}$ is conducted whereas the diode $D_{10}$ is cut off. As a result only the relay $Rl_2$ is energized so that its contacts $l_{2-1}$ and $l_{2-2}$ are switched to the normally open side (See FIGS. 10A and 10B). Thus the motor is driven in the reverse direction. On the other hand when the transistors $Tr_{55}$ and $Tr_{56}$ are turned on, the diode $D_{10}$ is turned on so that the relay $Rl_1$ is energized. The contacts $l_{1-1}$ and $l_{1-2}$ (See FIGS. 10A and 10B) are switched to the normally open side so that the motor is driven in the forward direction.

Next the repeat projection mode will be described. The resistors $R_{20}$ and $R_{21}$ and the transistor $Tr_{36}$ control the repeat interval. In other words they control in such a way that the first slide film of a group of slide films to be sequentially and repeatedly projected may be returned to the projection position after the last slide film of the group has been projected. Since the current flows from the resistor $R_{20}$ to the transistor $Tr_{36}$, the latter is turned on. The resistance of the resistor $R_{21}$ is so selected as to correspond to the first slide film of the slide group. Thus the current whose magnitude corresponds to the first slide film to be projected flows into the operational amplifier OPA-1.

The diodes $D_6$-$D_9$ and the resistors $R_{22}$-$R_{27}$ control the last slide film of the group of a plurality of slide films to be sequentially and repeatedly projected. The number of slide films to be repeatedly projected may be selected by the switch SB between 1 and 50 in the instant embodiment. In response to the depression of the switch SB, one of or a plurallity of the transistors $Tr_{37}$-$Tr_{39}$ are turned on so that the current whose magnitude is in proportion of the number of slide films to be repeatedly projected flows into the operational amplifier OPA-2.

In the repeat projection mode, slide films are projected one by one. The output voltage of the operational amplifier OPA-2 is positive until a predetermined number of slide films have been projected so that the current flows through the resistor $R_{49}$ into the base of the transistor $Tr_{59}$ to turn it on. But the transistor $Tr_{60}$ remains cut off. The output voltage of the operational amplifier OPA-2 becomes zero when a predetermined number of slide films have been projected so that the transistor $Tr_{59}$ is turned off while the transistor $Tr_{60}$ is cut off.

When the transistor $Tr_{36}$ is turned on, the output voltage of the operational amplifier OPA-1 is positive so that the relay $Rl_1$ is energized. Therefore the transistors $Tr_{64}$ and $Tr_{62}$ are turned on. The relay $Rl_4$ is energized so that the contact $l_{4-2}$ is switched to the normally open side. Thus the relay $Rl_4$ is self-held. When the relay contacts $l_{4-2}$ is switched, the transistors $Tr_{37}$-$Tr_{39}$ are cut off.

Since the output of the operational amplifier OPA-2 is negative, the relay $Rl_1$ is de-energized while the relay $Rl_2$ is energized. When the last slide film has been returned into the tray from the projection position, the switch $S_D$ (FIG. 11) is actuated to energize the relay $Rl_5$. The relay contact $l_{5-2}$ is closed so that the current flows into the motor drive circuit shown in FIG. 10B. The motor is rotated in the reverse direction so as to move the slide film tray in the reverse direction. As the tray is moved in the reverse direction, the signal representing the position of the slide tray changes. When the tray is returned to the position corresponding to the resistance across the resistor $R_{21}$, that is the position of the first slide to be repeatedly projected, the output of the operational amplifier OPA-1 becomes zero volt so that the relay $Rl_2$ is de-energized and the motor is stopped. Thereafter the slide films are sequentially projected again. Upon completion of the projection of the last slide film of the group, the tray is returned to the position of the first slide film to be repeatedly projected.

Figure 10A:
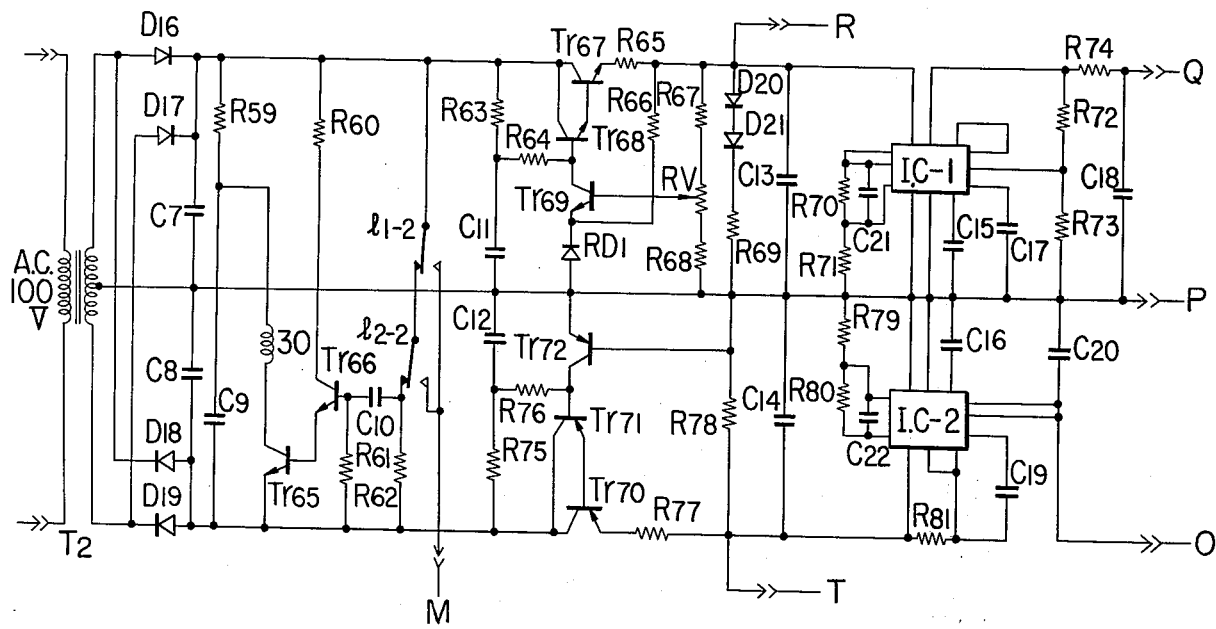
FIG. 10A is a diagram of a circuit capable of correcting the position at which the slide film tray is stopped.

Next the circuit shown in FIG. 10A will be described. FIG. 10A shows a diagram of a circuit for regulating the power source voltage (for example AC 100 volts) and a circuit for controlling the tray so as to stop it at a correct position (See FIG. 1, J).

Terminals M, O, P, Q, R and T are connected to the terminals with the same reference letters shown in FIG. 9. A transformer $T_2$ changes the power source voltage and diodes $D_{16}$-$D_{19}$ rectify the AC current. 30 denotes the position control plunger shown in FIG. 2 and $l_{1-2}$ and $l_{1-2}$ are contacts of the relays $Rl_1$ and $Rl_2$ shown in FIG. 9.

$Tr_{65}$-$Tr_{69}$ are NPN transistors; $Tr_{70}$-$Tr_{72}$, PNP transistors; IC-1 and IC-2, conventional integrated circuits for voltage regulation; $RD_1$, a diode used for voltage regulation; $C_7$-$C_{19}$, capacitors; $R_{59}$-$R_{81}$, resistors; and RV, a semi-fixed resistor for fine adjustment of voltage.

The stop position control circuit J comprises the resistors $R_{59}$-$R_{62}$, the capacitors $C_9$ and $C_{10}$, the relay contacts $l_{1-2}$ and $l_{2-2}$, the transistors $Tr_{65}$ and $Tr_{66}$ and the plunger 30. The relay contacts $l_{1-2}$ and $l_{2-2}$ are switched to the normally closed side when the signal entered by the keyboard shown in FIG. 6 coincides with the signal representing the position of the slide film in the projection position, but are switched to the normally open side when they are not coincident with each other.

Figure 2:
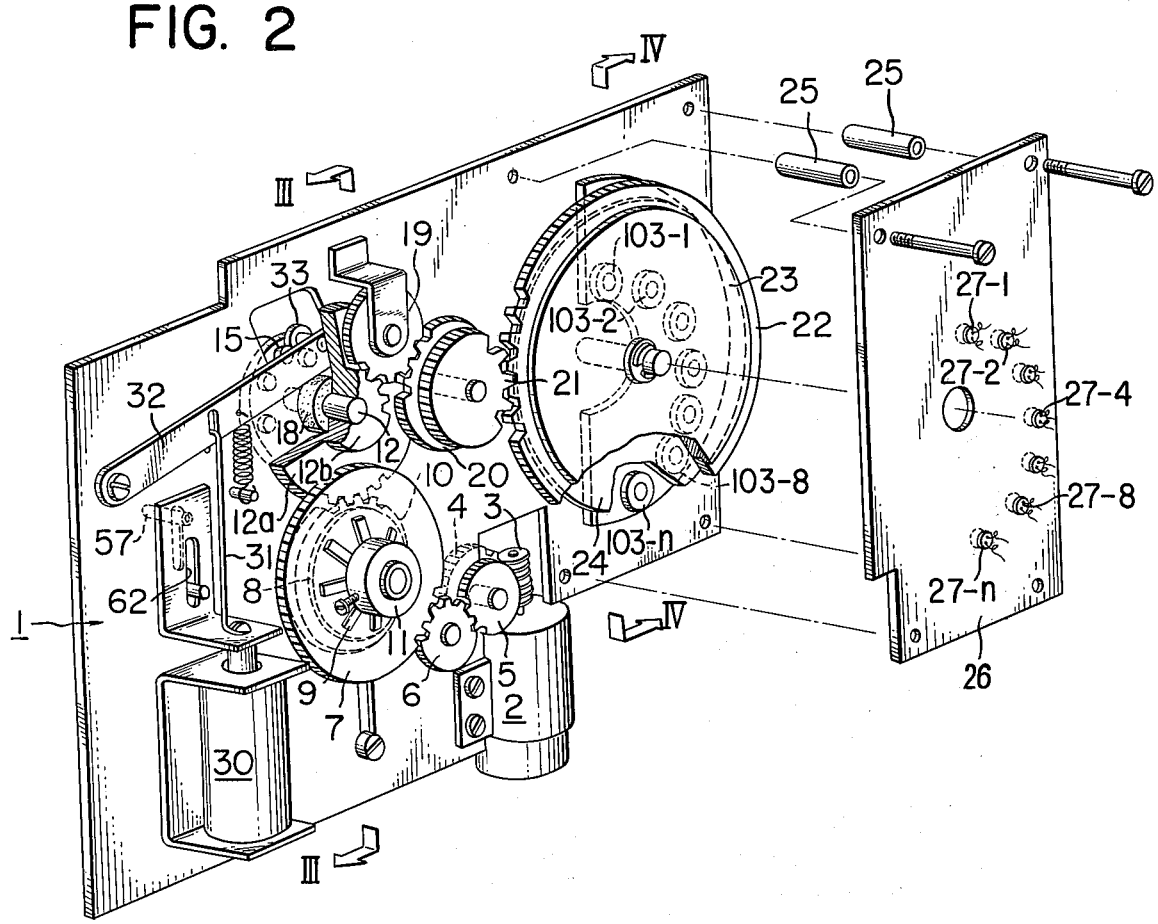
FIG. 2 is a perspective view illustrating a driving mechanism of the projector shown in FIG. 1.
Figure 4:
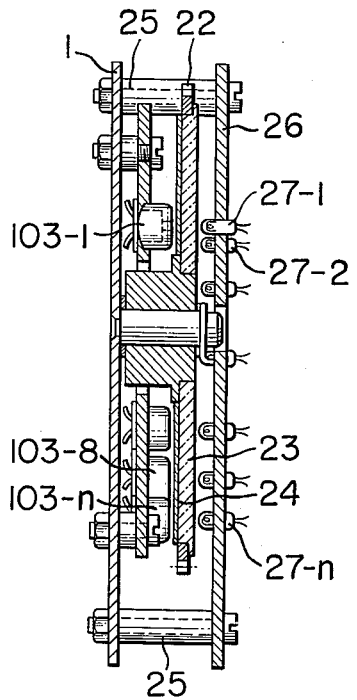
FIG. 4 is a cross sectional view looking in the direction indicated by the arrows IV—IV of FIG. 2.

When the relay armature closes the normally open contact, the tray is advanced in the forward direction and the capacitor $C_{10}$ is discharged through the resistor $R_{62}$. When the signals coincide with each other, relay armature $l_{1-2}$ closes the normally closed contact again so that the capacitor $C_{10}$ is charged. The charging current flows into the base of the transistor $Tr_{66}$ to turn it on. Therefore the transistor $Tr_{65}$ is turned on and the charge on the capacitor $C_9$ is discharged into the plunger 30 through the transistor $Tr_{65}$. Therefore the lever 30 shown in FIG. 2 is attracted to cause the member 33 to be placed between the rollers 15 so that the tray is stopped at and held in the correct position.

Next the voltage regulating circuit shown in FIG. 10A will be described. The tranistors $Tr_{67}$ and $Tr_{68}$ and the transistors $Tr_{70}$ and $Tr_{71}$ are so interconnected as to form the Darlington connections, respectively. An error amplifieying transistor $Tr_{69}$ is inserted in order to maintain a predetermined constant positive voltage level, and the transistor $Tr_{72}$ is inserted in order to maintain a predetermined constant negative voltage level. The emitter potential of the transistor $Tr_{69}$ is maintained at a predetermined level by the diode $RD_1$ while the base potential is maintained at a voltage derived by dividing the voltage between the output terminal R and the grounding terminal P by the voltage dividing resistor. When the potential at the terminal R increases in excess of a predetermined positive level, the potential between the base and emitter of the transistor $Tr_{69}$ is increased while the collector potential drops so that the potential at the terminal R is returned to its initial level. Thus the voltage is maintained at a predetermined constant level by the negative feedback.

The emitter of the transistor $Tr_{72}$ is grounded and the voltage derived by dividing the voltage between the terminals R and T by the resistors $R_{69}$ and $R_{78}$ is applied to the base therof. Thus the voltage is maintained at a predetermined constant level. The potentials at the output or reference terminals Q and O are also maintained at a predetermined level by the integrated circuits IC-1 and IC-2, respectively.

Figure 10B:
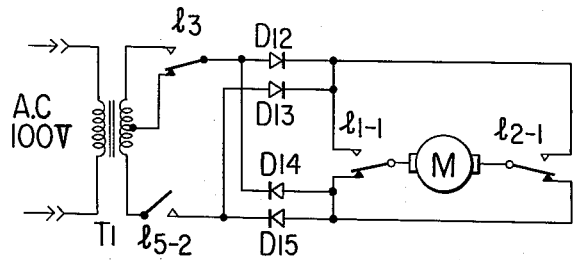
FIG. 10B is a diagram of a control circuit for a motor driving the slide film tray.

Next FIG. 10B will be described. FIG. 10B corresponds to the motor control circuit I shown in FIG. 1. The brake circuit comprises a transformer $T_1$, diodes $D_{12}$-$D_{15}$, and relay contacts 3 of the relay $1l_3$. Relay contacts $l_{5-2}$ are those of the relay $Rl_5$; relay contacts $l_{1-1}$ are those of the relay $Rl_1$ for moving the tray in the forward direction; relay contacts $l_{2-1}$ are those of the relay $Rl_2$ for moving the tray in the reverse direction.

When the normally open relay contact $l_{1-1}$ is closed while the normally closed contact $l_{2-1}$ is closed, the driving current flows from the power source through the normally opened contact $l_{1-1}$ of the relay $Rl_1$, its armature, the motor 2 (See FIG. 2), the armature of the relay $Rl_2$, and its normally closed contact. Therefore the motor rotates in the forward direction to move the tray in the forward direction.

When the normally closed contact of the relay $Rl_1$ and the normally opened contact $l_{2-1}$ of the relay $Rl_2$ are closed, the current flows from the power source through the normally opened contact of the relay $Rl_2$, the armature thereof, the motor 2, the armature of the relay $Rl_1$, its normally closed contact $l_{1-1}$ so that the motor is reversed to reverse the tray. When the normally opened contact $l_3$ is closed, the high voltage is applied to the motor 2, but when the normally closed contact $l_3$ is closed, the low voltage is applied to the motor 2 to apply brake thereto. When the normally closed contacts $l_{1-1}$ and $l_{2-1}$ of the relays $Rl_1$ and $Rl_2$ are closed, the circuit including the normally closed contact $l_{1-1}$, the armature of the relay $Rl_1$, the motor, the armature of the relay $Rl_2$ and the normally closed contact thereof is established so that the motor is short-circuited and forced to stop.

Next FIG. 11 will be described. The circuit shown in FIG. 11 is a main electronic circuit in the main body of a slide projector and corresonds to SIL shown in FIG. 1. As already explained elsewhere with reference to FIG. 3, the motor 39 is used to push a slide film into the projection position. The relay $Rl_5$ establishes or breaks the start circuit for the motor 2 and the circuit of the motor 39. When the slide film is returned from the projection position into the tray, a switch 44 has its normally closed contact closed, but when the slide film is pushed into the projection position as shown in FIG. 3 the normally closed contact of a switch 44 is closed. A switch $S_F$ is closed when it is desired to project the slide films one by one; a switch SS-2 is a start switch; a switch $S_G$ is a switch on the side of the main body of the slide film projector; $D_{22}$ and $D_{25}$ are diodes; $C_{23}$ and $C_{24}$, capacitors, $Tr_{73}$-$Tr_{76}$, transistors; $R_{82}$-$R_{89}$, resistors; $Rt_1$-$Tr_n$, resistors in a timer circuit; Sc, a switch of the timer circuit; and ma, a manual contact. When the contact ma is closed, the projection time may be controlled manually, but when the armature of the switch Sc closes other contacts connected to the resistors in the timer circuit, a projection time is automatically controlled. The terminal P has been already explained elsewhere.

Next the mode of operation of the circuit shown in FIG. 11 will be described. In the normal projection mode in which slide films are projected one by one, the switch $S_G$ or switch SF on the keyboard is closed so that the current flows from the positive terminal of the power source through the motor 39, the armature of the relay $Rl_5$, its normally closed contact, the switch SG or SF. Therefore the motor 39 is driven so that the rotary disk 42 shown in FIG. 3 is rotated to bring the slide film in the tray into the projection position and to return the same into the tray after a predetermined projection time. The switches 44 and 45 have been already described with reference to FIG. 3.

In the random access projection mode, a selected slide film is placed into the projection position and returned into the tray after projection in the manner described hereinbefore. In case of the next random access projection, the relay contact $l_{4-1}$ is closed and the relay $Rl_5$ is energized to open its contact $l_{5-1}$ so that the motor 39 is completely stopped. Thereafter the motor 2 is driven to bring a selected slide film into the projection position and when the signal entered by the keyboard coincides with the address of the slide film in the projection position, the relay $Rl_4$ is de-energized to open its contact $l_{4-1}$. The relay $Rl_5$ is de-energized to close its contact $l_{5-1}$. Then the motor drive circuit is closed to place the slide film into the projection position. In like manner the random access projection is cycled.

Next the mode of operation of the timer circuit will be described hereinafter. When one of the contacts of the switch SC connected to the resistors $Rt_1$-$Rt_n$ is closed, the capacitor $C_{24}$ is charged. The charging time is dependent upon the resistor connected thereto. The emitter potential of the transistor $Tr_{76}$ is maintained at a predetermined level by the resistors $R_{90}$ and $R_{87}$, and the base potential thereof reaches a predetermined high level after a predetermined time which equals the charging time of the capacitor $C_{24}$, so that the transistor $Tr_{76}$ is turned on. Therefore the transistors $Tr_{75}$, $Tr_{74}$ and $Tr_{73}$ are turned on so that the driving current flows from the positive terminal of the power source through the motor 39, the relay contact $l_{5-1}$ and the transistor $Tr_{73}$. Thus the motor 39 is driven. As described hereinbefore, when the switch 45 is opened the capacitor $C_{24}$ is discharged through the resistor 89. Thus the projection time during which the slide film remains in the projection position indicated by the broken lines in FIG. 3 may be controlled by selecting one of the resistors $Rt_1$-$Rt_n$.

It is of course possible to make a reverse projection when a circuit for reversing the motor 39 is provided.

In the projector in accordance with the present invention, the random access projection mode may be switched selectively to the normal projection mode in which slide films are projected one by one, the repeat projection mode or next random access projection mode by operating the switches so that various slide film projection programs may be more freely selected.

We claim:

1. A film projection system capable of selecting projection modes comprising:
   means for storing a plurality of slide films;
   transport means for transporting said slide film storage means to a slide film projecting position where the slide film is set for projection;
   first driving means for driving said transport means;
   sliding means for selectively sliding the slide film in said storage means between the storing position of said storage means and the slide film projectable position where the projection of the slide film can be performed;
   stepping means adapted to couple to said transport means and cooperate with said sliding means for moving said transport means by one frame of the film by coupling to said transport means before said slide means causes the slide film to slide to said slide film projectable position;
   second driving means for driving said sliding means;
   sequential projection control means for controlling said second driving means to sequentially project said slide film one frame at a time;
   random access projection control means for controlling said first and second driving means to selectively project a desired film of said plurality of slide films;
   switching means for selectively switching projection modes, one of which is a sequential projection mode selected by said sequential projection control means, and the other being a random access projection mode selected by said random access projection control means; and
   releasing means for releasing said stepping means from being coupled with said transport means when said random access projection control means is selectively actuated by said switching means to control said second driving means.

2. A film projection system according to claim 1 wherein said random access projection control means comprises means for indicating a desired one of said plurality of slide films to be projected, means for detecting the location of the slide film in the slide film projecting position, and means for comparing the outputs of said indicating means and said detecting means, said comparing means stopping the driving of said first driving means responsive to the coincidence output developed therefrom when both of said outputs of said indicating means and said detecting means are coincident, and then starting the driving of said second driving means.

3. A film projection system according to claim 2 wherein said detecting means comprises means for recording film location information and means for reading out the film location information in said recording means.

4. A film projection system according to claim 3 wherein said reading out means comprises photoelectric converting means and a light source which are symmetrically disposed with respect to each other against said film location information recording means.

5. A film projection system according to claim 2 wherein said releasing means includes an electromagnetic member actuated by the coincident output from said comparing means, said electro-magnetic member controlling the releasing operation from the coupling position of said stepping means with said transport means.

6. A film projection system according to claim 1 wherein said stepping means includes coupling means adapted to couple to said transport means, and selecting means for selecting the motions of step up and step back of said transport means, said selecting means switching said coupling means from one position to another position between a first coupling position for the step up of said transport means and a second coupling position for the step back of said transport means.

7. A film projection system according to claim 6 wherein said selecting means includes an electromagnetic member for controlling, to switch said coupling means from the one position to the other position between the first coupling position and the second coupling position.

8. A film projection system capable of selecting projection modes comprising:
    means for storing a plurality of slide films;
    transport means for transporting said slide film storage means to a slide film projecting position where the slide film is set for projection;
    first driving means for driving said transport means;
    sliding means for selectively sliding the slide film in said storage means between the storing position of said storage means and the slide film projectable position where the projection of the slide film can be performed;
    stepping means adapted to couple to said transport means and cooperate with said sliding means for moving said transport means by one frame of the film by coupling to said transport means before said slide means causes the slide film to slide to said slide film projectable position;
    second driving means for driving said sliding means;
    automatic repeat projection control means for selecting and repeatedly projecting the desired number of films of said plurality of slide films, said control means including return control means for returning said transport means to a starting position thereof by the actuation of said first driving means after said second driving means is driven by a motion corresponding to the desired number of film frames and the last one of the selected slide films has finished being projected;
    random access projection control means for controlling said second driving means by motion corresponding to one frame after controlling said first driving means to selectively project a desired film of said plurality of slide films;
    switching means for selectively switching projection modes, one of which is automatical repeat projection mode selected by said automatic repeat projection control means, and the other being a random access projection mode selected by said random access projection control means; and
    releasing means for releasing said stepping means from being coupled with said transport means when said random access projection control means is selectively actuated by said switching means to control said second driving means.

9. A film projection system according to claim 8 wherein said automatic repeat projection control means comprises means for indicating a desired one of said plurality of slide films to be projected, means for detecting the location of the slide film in said slide film projecting position, and means for comparing the outputs of said indicating means and said detecting means, said comparing means stopping the driving of said first driving means responsive to the coincidence output developed therefrom when both of said outputs of said indicating means and said detecting means are coincident, and then starting the driving of said second driving means.

10. A film projection system according to claim 8 further comprising sequential projection control means for controlling said second driving means to sequentially project said slide film one frame at a time; and
    operating means for actuating said sequential projection control means and for disactuating said random access projection control means and said automatic repeat projection control means during the time when said operating means is energized.

* * * * *

UNITED STATES PATENT OFFICE
CERTIFICATE OF CORRECTION

Patent No. 3,907,414                    Dated  September 23, 1975

Inventor(s)    MASANORI UCHIDOI, ET AL

It is certified that error appears in the above-identified patent and that said Letters Patent are hereby corrected as shown below:

On the Title Page, in the Abstract, line 14, "mode are provided" should read --mode.--;

Column 1, line 29, "yet devised" should read --yet been devised--;

Column 3, line 17, "detects" should read --detect--;

Column 4, line 46, "upon which" should read --which--;

Column 7, line 31, "weight" should read --weigh--;

Column 7, line 40, "film which" should read --film--;

Column 7, line 55, "remains" should read --remain--;

Column 8, line 6, "is" should read --are--;

Column 8, line 10, "is" should read --are--;

Column 8, line 11, "are" should read --is--;

Column 8, line 13, "resistor" should read --resistors--;

Column 8, line 16, "is" should read --are--;

Column 8, line 18, "is" should read --are--;

Column 8, line 28, "is" should read --are--;

Column 8, line 54, "when it is desired" should read --when--;

UNITED STATES PATENT OFFICE
CERTIFICATE OF CORRECTION

Patent No. 3,907,414      Dated September 23, 1975

Inventor(s) MASANORI UCHIDOI, ET AL      PAGE - 2

It is certified that error appears in the above-identified patent and that said Letters Patent are hereby corrected as shown below:

Column 8, line 55, "film" should read --film is desired--;

Column 8, line 56, "been already entered" should read --already been entered--;

Column 9, line 61, "$R_{37}$" (first occurrence) should read --$R_{34}$--;

Column 9, line 65, "$R_{50}$- $R_{57}$" should read --$R_{50}$-$R_{57}$,--;

Column 10, lines 63 and 64, "re-placed" should read --placed--;

Column 11, line 1, "switch" should read --switches--;

Column 12, line 60, "of" should read --to--;

Column 14, line 12, "amplifieying" should read --amplifying--;

Column 14, line 39, "3" should read -- $\ell_3$--;

Column 14, line 39, "$1\ell_3$" should read --$R\ell_3$--;

Column 18, line 19, claim 8, "automatical" should read --automatic--;

Signed and Sealed this third Day of February 1976

[SEAL]

Attest:

RUTH C. MASON
*Attesting Officer*

C. MARSHALL DANN
*Commissioner of Patents and Trademarks*